2,881,066
Patented Apr. 7, 1959

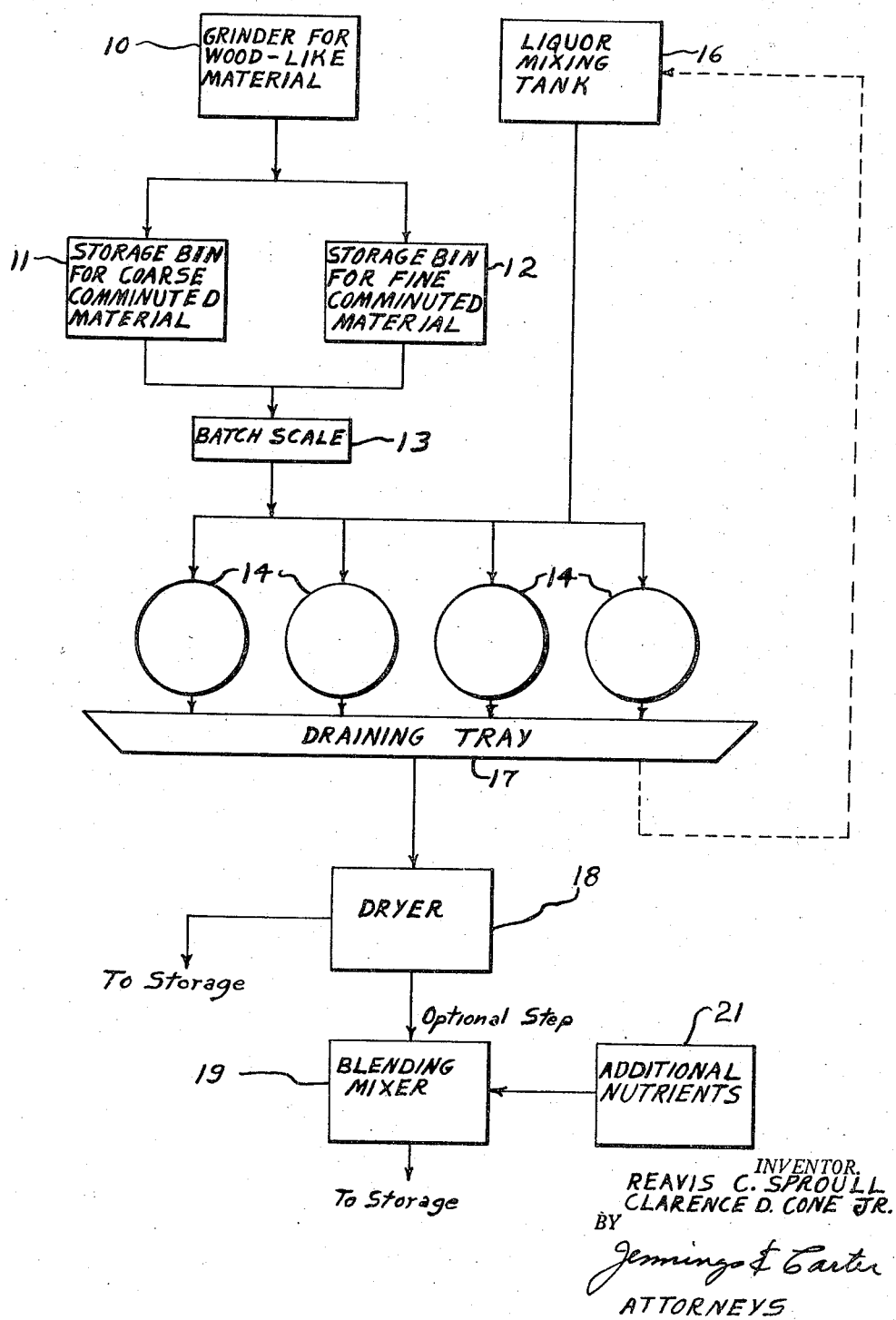

2,881,066

PROCESS FOR PRODUCING NITROGENATED AND PHOSPHORYLATED FERTILIZER, MULCH AND SOIL CONDITIONER

Reavis C. Sproull and Clarence D. Cone, Jr., Savannah, Ga., assignors to Southern Lumber Company, a corporation of Arkansas Application March 23, 1956, Serial No. 573,449

10 Claims. (Cl. 71—29)

This invention relates to a combined fertilizer, mulch and soil conditioner and the process for producing the same and has for an object the provision of such a product which shall contain water insoluble nutrients and which functions as a soil conditioner by rendering the soil more permeable to air and moisture.

Another object of our invention is to provide a process and product of the character designated in which the carbon to nitrogen ratio of the final product is reduced to a safe value for decay bacterial action to take place, thereby eliminating the heretofore objections to the use of bark and other wood materials as a mulch and soil conditioner.

Another object of our invention is to provide a combined fertilizer mulch and soil conditioner in which the natural acidity of the bark or other wood material employed, which normally would limit its application as a mulch or soil conditioner, is neutralized.

A more specific object of our invention is to provide a combined fertilizer, mulch and soil conditioner in which the nutrient is chemically bonded to the bark or other wood material employed whereby it is released only through decay processes, thus providing a sustained fertilizer having the beneficial qualities obtained from the more desirable humus materials.

Another object of our invention is to provide a process of the character designated in which wood-like materials can be both nitrogenated and phosphorylated simultaneously to an appreciable extent without decomposition and without destroying their humus forming qualities through carbonization.

A further object of our invention is to provide a product of the character designated which shall have qualities of both organic and inorganic fertilizers in that it provides humus-like materials with sustained nutrient value as well as immediate nutrient value.

A still further object of our invention is to provide a combined fertilizer, mulch and soil conditioner of the character designated which shall have excellent flow characteristics and homogeneity.

As is well known in the art to which our invention relates, nitrogen and phosphorus are essential for normal plant metabolism. Accordingly, in the preparation of fertilizer mixtures, it has been the usual practice to add one or several nitrogen and phosphorus compounds thereto. Some of these compounds have been water soluble and as a result have been rapidly leached from the soil surrounding the plant. Also, because of their water soluble nature, they are sometimes initially applied to the growing plant in quantities in excess of that desirable for normal plant growth.

To overcome the above difficulties, we provide a nitrogenated and phosphorylated fertilizer, mulch and soil conditioner which requires as a raw material naturally occurring plant residues heretofore regarded as waste, such as barks, sawdust and other wood-like materials. The product is produced by treating comminuted wood-like material with an aqueous solution of urea and phosphoric acid. After the material is thus treated, it is dried at a temperature below the temperature at which carbonization and loss of nitrogen takes place.

The single view, forming a part of this application, is a flow sheet of our improved process.

In carrying out our process, an organic wood-like material, such as bark or sawdust or a mixture thereof, is ground or pulverized in a suitable grinder 10 to reduce the same to small particle size. To provide fertilizer mixtures having different qualities, the wood-like material may be ground to different particles sizes. Storage bins 11 and 12 are provided for receiving the coarse and fine comminuted material, respectively. The comminuted wood-like material thus prepared is transferred to a batch scale 13 and is then conveyed to a rotary digester 14.

A treating solution comprising the desired amounts of urea, phosphoric acid and water is supplied to the rotary digester 14 from a suitable liquor mixing tank 16. In actual practice, we have found that a solution comprising, by weight, approximately 6.5% urea, 45.7% phosphoric acid (85% pure $H_3PO_4$) and 47.8% water is satisfactory in every respect and produces a product containing approximately 4% nitrogen and 15% phosphorus. Technical trade mixtures may also be employed. While we show the reaction containers as being in the form of rotary digesters, it will be apparent that other reaction tanks may be employed in combination with suitable means for stirring the comminuted material into the solution. Preferably, a plurality of rotary digesters 14 are employed whereby the full capacity of the grinder 10 and liquor mixing tank 16 may be utilized. Preferably, the weight ratio of the dried comminuted material to the treating solution should be approximately .083 to .15.

With the digester 14 charged with the wood-like material and the treating solution, the contents thereof are heated to a temperature of from 80° to 100° C., whereby chemical reaction takes place between the comminuted material and the treating solution. In actual practice, we have found that a reaction period of approximately 1 hour produces a satisfactory product. The material thus treated in digesters 14 is preferably washed and then drained of excess liquor by means of a suitable draining tray 17. Next the treated material is transferred to a drier 18 where it is dried up to a maximum temperature of approximately 110° C. Up to this temperature, we find that no carbonization or loss of nitrogen takes place. It is very important that true carbonization be eliminated due to the fact that where true carbonization occurs, the product will not decay.

In actual tests, we have found that thorough washing does not remove the phosphorus and nitrogen compounds from the treated material. We have also found that woodlike materials, such as bark, sawdust, or mixtures thereof can be both nitrogenated and phosphorylated simultaneously to an appreciable extent with decomposition of these materials. The organic constituents of both pine bark and sawdust render these materials most reactive to the phosphorylation mixture. In fact, bark is so reactive that amounts of phosphorus can be added that are fifty times or more that which could be chemically bonded to pure cellulose. Our product appears to be wholly different chemically from the product obtained by the phosphorlyation of cellulose of cotton, which is rendered highly decay resistant by such a treatment. The amount of nitrogen reacting with the comminuted bark remains essentially constant when used in solutions with varied proportions of urea and phosphoric acid. However, the amount of phosphorus reacting is inversely proportional to the ratio of urea to phosphoric acid in the solution. For example, using a solution which has a urea to acid ratio of 0.222 produces a product having a nitrogen content of 4.8% and phosphorus content of 3.8%. On the other hand, a treating solution with a urea to acid ratio of 0.143 produces a product having a nitrogen content of 3.7% and a phosphorus content of 7.3%. With sawdust, the reverse appears to occur. The phosphorus content remains substantially constant while the nitrogen content varies directly as the urea to phosphoric acid ratio. These factors appear to be very important as they suggest that the amount of bark or sawdust and the amounts of each element relative to the other can be controlled to give the best composition for the final product. Accordingly, a fertilizer having almost any desired percentages of nitrogen and phosphorus can be made, thus adapting the fertilizer for use on special crops. Also, the product thus produced has the qualities of both organic and inorganic fertilizers in that it has humus-like materials with sustained nutrient value as well as immediate nutrient value.

To insure complete utilization of the treating solution, the weak solution is recycled from the rotary digester 14 to the liquor mixing tank 16.

After drying the product in drier 18 it is transferred to storage or for use. If desired, the dried product may be blended with other ingredients or plant nutrients in a blending mixer 19, the additional nutrients being supplied from a supply tank 21. The nutrients can be added by a dry blending operation, or if desired, the nitrogenated or phosphorlyated material can be soaked in solutions of proper concentrations containing additional plant nutrients. The nutrients added by the latter method are thus absorbed into the interstices of the wood-like material and also are deposited thereon in a finely powdered state. These additional water soluble ingredients are thereby rendered less subject to leaching and removal from the proximity of the plant by rainfall or watering. After blending in the mixer 19, the material is transferred to storage or for use as a fertilizer, mulch and soil conditioner.

From the foregoing, it will be seen that we have devised an improved fertilizer, mulch and soil conditioner and process for producing the same. By bonding the nitrogen and phosphorus by chemical reaction within the comminuted material in accordance with our process, the nutrients are available over several growing seasons without liability of injury to plants treated with the product. There appears to be a delayed release of nitrogen by our improved product while the phosphorus is released more rapidly during the first month after application. This is of interest due to the fact that it indicates that the phosphorus and nitrogen, during nitrogenation and phosphorylation, react with separate bark constituents. During the second month the procedure is reversed and nitrogen is released more rapidly than phosphorus. This early phosphorus release is quite desirable since it would be available for plant growth in the production of new shoots and buds.

In actual practice, we have found that bark and sawdust and other wood waste from conifers, such as pine, is satisfactory in every respect. The pine materials actually treated have been selected from the group consisting of slash pine (*Pinus caribaea*), long leaf pine (*Pinus palustris*), short leaf pine (*Pinus echinata*) and loblolly pine (*Pinus taeda*).

We wish it to be understood that we do not desire to be limited to the exact details of the process shown and described, for obvious modifications will occur to a person skilled in the art.

What we claim is:

1. In a process for producing a combined fertilizer, mulch and soil conditioner, the steps which comprise chemically reacting comminuted wood-like material with an aqueous solution of urea and phosphoric acid at a temperature of from 80° to 100° C. whereby water insoluble nitrogen and phosphorus compounds are chemically bonded within said material.

2. In a process for producing a combined fertilizer, mulch and soil conditioner, the steps which comprise chemically reacting comminuted wood-like material with an aqueous solution of urea and phosphoric acid at a temperature of from 80° to 100° C. whereby water insoluble nitrogen and phosphorus compounds are chemically bonded within said material, and drying the reacted material at a temperature below the temperature at which carbonization and loss of nitrogen takes place.

3. In a process for producing a combined fertilizer, mulch and soil conditioner, the steps which comprise chemically reacting comminuted wood-like material with an aqueous solution of urea and phosphoric acid at a temperature of from 80° to 100° C. whereby water insoluble nitrogen and phosphorus compounds are chemically bonded within said material, and drying the material thus soaked at an approximate maximum temperature of 110° C.

4. A process as defined in claim 3 in which the aqueous solution comprises approximately 6.5% urea, 45.7% phosphoric acid (85% $H_3PO_4$), and 47.8% water.

5. A process as defined in claim 3 in which the weight ratio of the wood material to the solution is approximately 0.83 to .15.

6. A process as defined in claim 3 in which the reacted material is drained of excess liquor and is washed prior to drying.

7. A process as defined in claim 3 in which the reacting solution is in contact with the wood material for approximately 1 hour.

8. A process as defined in claim 3 in which the wood-like material is derived from a conifer.

9. A process as defined in claim 3 in which the wood-like material is in the form of sawdust.

10. A process as defined in claim 3 in which the wood-like material is in the form of bark.

References Cited in the file of this patent

UNITED STATES PATENTS

| | | |
|---|---|---|
| 847,749 | Ellis | Mar. 19, 1907 |
| 1,799,176 | Metzl | Apr. 7, 1931 |
| 2,036,870 | Harvey | Apr. 7, 1936 |
| 2,101,807 | Corey | Dec. 7, 1937 |
| 2,498,480 | Bierlich | Feb. 21, 1950 |